(12) United States Patent
Patterson (10) Patent No.: US 8,427,580 B1
(45) Date of Patent: Apr. 23, 2013

(54) SYSTEM AND METHOD FOR DATA SYNCHRONIZATION

(75) Inventor: Joseph Martin Patterson, Carlsbad, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 811 days.

(21) Appl. No.: 12/629,815

(22) Filed: Dec. 2, 2009

(51) Int. Cl.
*H04N 5/04* (2006.01)
*H04N 9/44* (2006.01)

(52) U.S. Cl.
USPC .................................. 348/500; 348/211.11

(58) Field of Classification Search ............ 348/211.11, 348/222.1, 500
See application file for complete search history.

(56) References Cited

PUBLICATIONS

Stellari et al., "Time-Resolved Optical Measurements from 0.13 um CMOS Technology Microprcessor Using a Superconducting Single-Photon Detector", Proceedings from the 29th International Symposium for Testing and Failure Analysis, Nov. 2-6, 2003, pp. 40-44.

Desplats et al., "IC Diagnostic with Time Resolved Photon Emission and CAD Auto-channeling", Proceedings from the 29th International Symposium for Testing and Failure Analysis Nov. 2-6, 2003, pp. 45-54.

*Primary Examiner* — Gevell Selby
(74) *Attorney, Agent, or Firm* — Turocy & Watson, LLP (57) ABSTRACT

A system and method are provided for synchronizing data collected from asynchronously clocked circuitry. The method provides an apparatus having inputs to accept a first clock signal and which has a plurality of devices synchronously timed to a third clock, but asynchronous from the first clock signal. Data frames are simultaneously collected for the plurality of devices, at a second clock repetition rate synchronous to the first clock, of device output detection events responsive to the trigger signal. The second clock repetition rate is greater than the first clock repetition rate. High contrast data frames are saved of device output detection events. A determination is made of a first device in the circuit block acting as the third clock trigger. Saved data frames with first device output detection events are recognized as synchronization frames, and the saved data frames are organized around the synchronization frames.

22 Claims, 5 Drawing Sheets

SYSTEM AND METHOD FOR DATA SYNCHRONIZATION

BACKGROUND OF THE INVENTION

1. Field of the Invention

This invention generally relates to asynchronous data collection and, more particularly, to a system and method for collecting image data that is unsynchronized to a camera trigger.

2. Description of the Related Art

Figure 1:
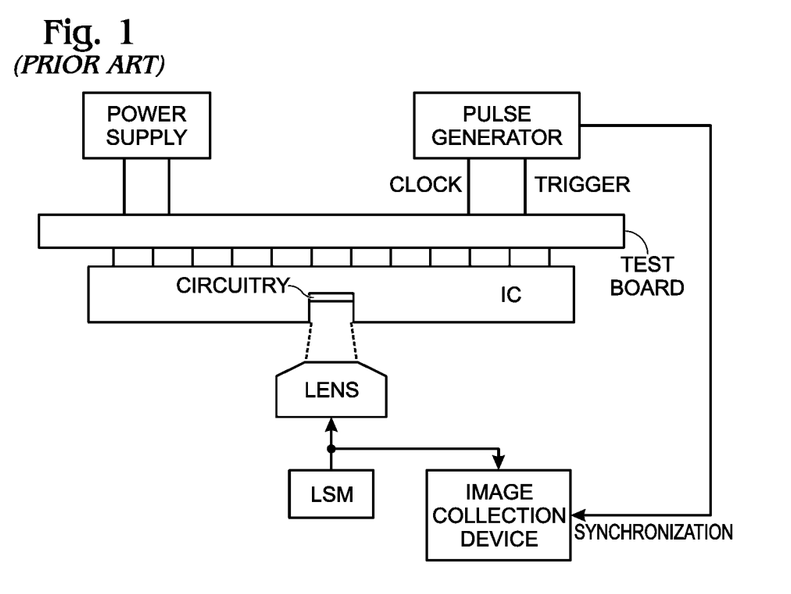
FIG. 1 is a schematic block diagram depicting a Picosecond Imaging Circuit Analysis (PICA) test setup (prior art).

FIG. 1 is a schematic block diagram depicting a Picosecond Imaging Circuit Analysis (PICA) test setup (prior art). PICA is a technique that collects near infrared (NIR) light emitted by the hot carriers in a transistor channel. Typically, the integrated circuit (IC) chip under test is electrically connected to a test board. The test board supplies dc power, as well as clock and trigger stimulus signals. The backside of the IC chip may be thinned, and a small area further etched to expose circuitry of interest. A laser scanning microscope and lens may be used to precisely locate the circuitry under investigation, and image data is collected using a high-speed image collection device (e.g., a camera).

If the circuitry under investigation operates synchronously with the clock and trigger supplied by the pulse generator, the image data collection device can be synchronized to circuit operations through the pulse generator. However, depending upon the design and function, the circuitry need not necessarily operate synchronously with respect to the clock and trigger. In that case, the pulse generator cannot supply synchronized points against which the collected image data can be referenced.

It would be advantageous if data from IC circuitry, asynchronously clocked with respect to a camera trigger, could be sampled and retimed to a synchronous clock, to support circuit performance analysis.

SUMMARY OF THE INVENTION

A system and method are presented to synchronize information from internally-asynchronous circuitry within integrated circuits (ICs) that has been collected by techniques such as Picosecond Imaging Circuit Analysis (PICA). Alternately stated, the circuitry in question may be asynchronous to an IC pin that is externally accessible. Conventionally, images containing time resolved information cannot be collected and stored for analysis in a way that permits asynchronously clock circuitry to be synchronized to a known clock, to create repeating patterns over a period of time. Described herein is a means to collect information in such a way that permits the post-processing of multiple time frames of information, so that they can be combined and realigned to a synchronous clock.

Accordingly, a method is provided for synchronizing data collected from asynchronously clocked circuitry. The method provides an apparatus having inputs to accept a first clock signal and a synchronous trigger signal, and which has a circuit block including a plurality of devices. The plurality of devices is synchronously timed to a third clock, but asynchronous from the first clock signal. The method supplies the first clock signals, at a first clock repetition rate, and trigger signals to the apparatus. Data frames are simultaneously collected for the plurality of devices, at a second clock repetition rate synchronous to the first clock, of device output detection events responsive to the trigger signal. The second clock repetition rate is greater than the first clock repetition rate. High contrast data frames of device output detection events are saved. Over a plurality of first repetition rate clock periods, an average number of device output detection events is determined per frame, and a threshold is set above the average number. The saved frames are the ones having a number of device output detection events greater than the threshold.

A determination is made of a first device in the circuit block acting as the third clock trigger. The first device is either located at predetermined coordinates in the circuit block, or an analysis is performed to find a device having the fewest number of approximately periodic detection events, as considered from the perspective of the first clock. Saved data frames with first device output detection events are recognized as synchronization frames, and the saved data frames are organized around the synchronization frames.

The saved data frames are organized by creating at least one loop time sequence, where the loop sequence includes a plurality of saved data frames in a sequential order in time, beginning with a synchronization frame, and clocked at the first repetition rate.

Additional details of the above-described method, and a system for synchronizing data collected from a device under test with asynchronously clocked circuitry, are provided below.

DETAILED DESCRIPTION

As used in this application, the terms "component," "module," "system," and the like may in some instances refer to an automated computing system entity, such as hardware, firmware, a combination of hardware and software, software, software stored on a computer-readable medium, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 2:
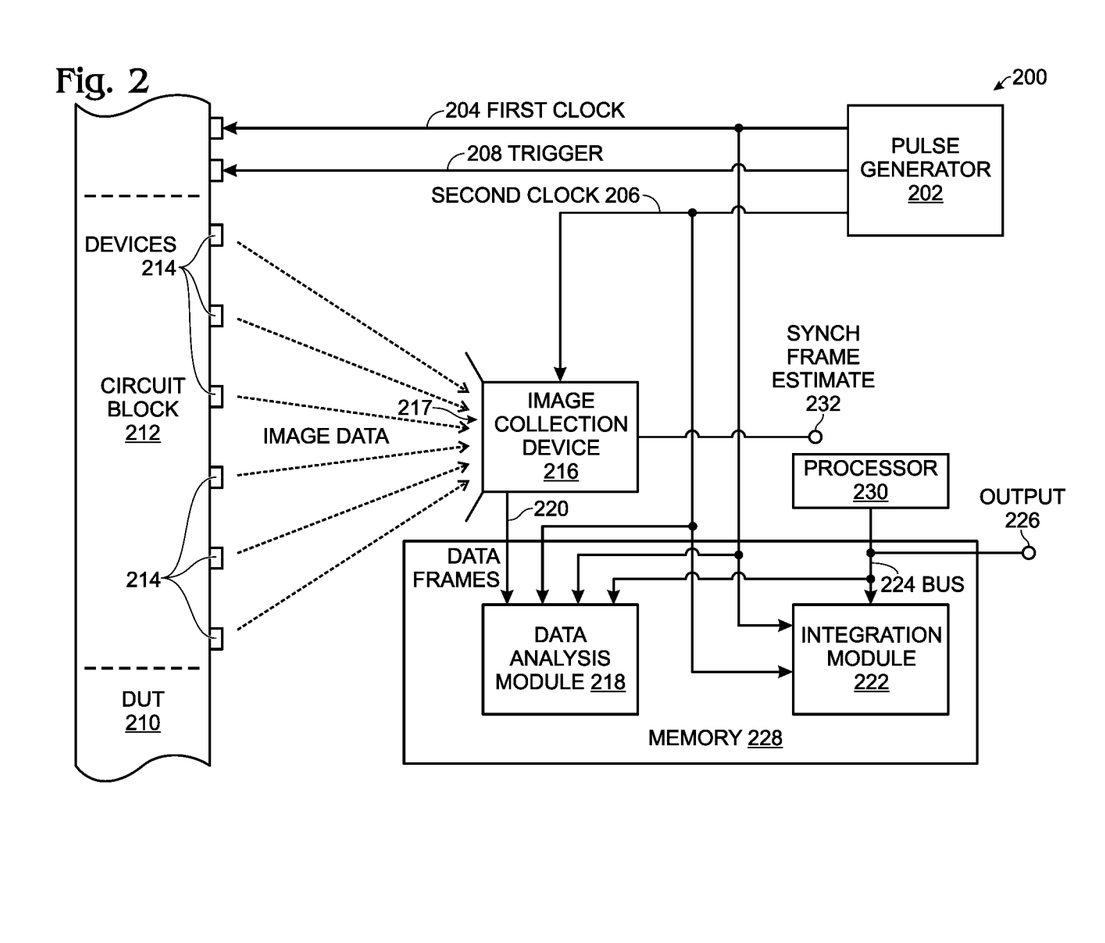
FIG. 2 is a schematic block diagram of a system for synchronizing data collected from a device under test with asynchronously clocked circuitry.

FIG. 2 is a schematic block diagram of a system for synchronizing data collected from a device under test with asynchronously clocked circuitry. The system 200 comprises a pulse generator 202 to supply a first clock signal at a first clock repetition rate on line 204, a second clock on line 206 at a second clock repetition rate greater than the first clock repetition rate, and a synchronous trigger signal on line 208. In one aspect the trigger and first clock are the same signal. The first clock and trigger signals are supplied to a device under test (DUT) 210 having a circuit block 212 including a plurality of devices 214 synchronously timed to a third clock that is asynchronous from the first clock signal.

A data collection device 216 has an input connected to the pulse generator on line 206 to receive the second clock signal and an input on line 217 to simultaneously collect data frames for the plurality of devices 214 at the second clock repetition rate. The data frames include device output detection events responsive (but not synchronous) to the trigger signal on line 208. As shown, the data collection device 216 is an image collection device (e.g., a camera) having an input interface 217 (e.g., a lens aperture) for collecting image data of device output signal transitions. Alternately, the image collection device is an array detector, infrared (IR) TIVA, or a device that collects x-rays or alpha particles for example. Switching transistors are known to emit light.

A data analysis module 218 has inputs on lines 204 and 206 to accept the first and second clock signals, and an input on line 220 to accept the collected data frames from the camera 216. The data analysis module 218 saves high contrast data frames of device output detection events, and determines a first device in the circuit block acting as the third clock trigger. The data analysis module 218 recognizes saved data frames with first device output detection events as synchronization frames.

An integration module 222 has inputs on lines 204 and 206 to accept the first and second clock signals, an input on line 224 to accept the saved data frames and the synchronization frames. The integration module 222 is connected to an output terminal 226 to supply the saved data frames organized around the synchronization frames. The output may be data that can be stored in a memory, an electronic display, or a tangible print-out.

Although it would be possible to build the integration module and data analysis module in hardware, it is more practical to build these modules as applications of software instructions stored in a tangible memory medium 228 that are executed by processor 230. In that case, communications between the modules would be enabled through the use of the data/address bus 224. Alternately (but not shown), an operating system (OS) may be used to manage the above-mentioned applications, as well as other applications (not shown), such as might be embedded in a personal computer.

Figure 3:
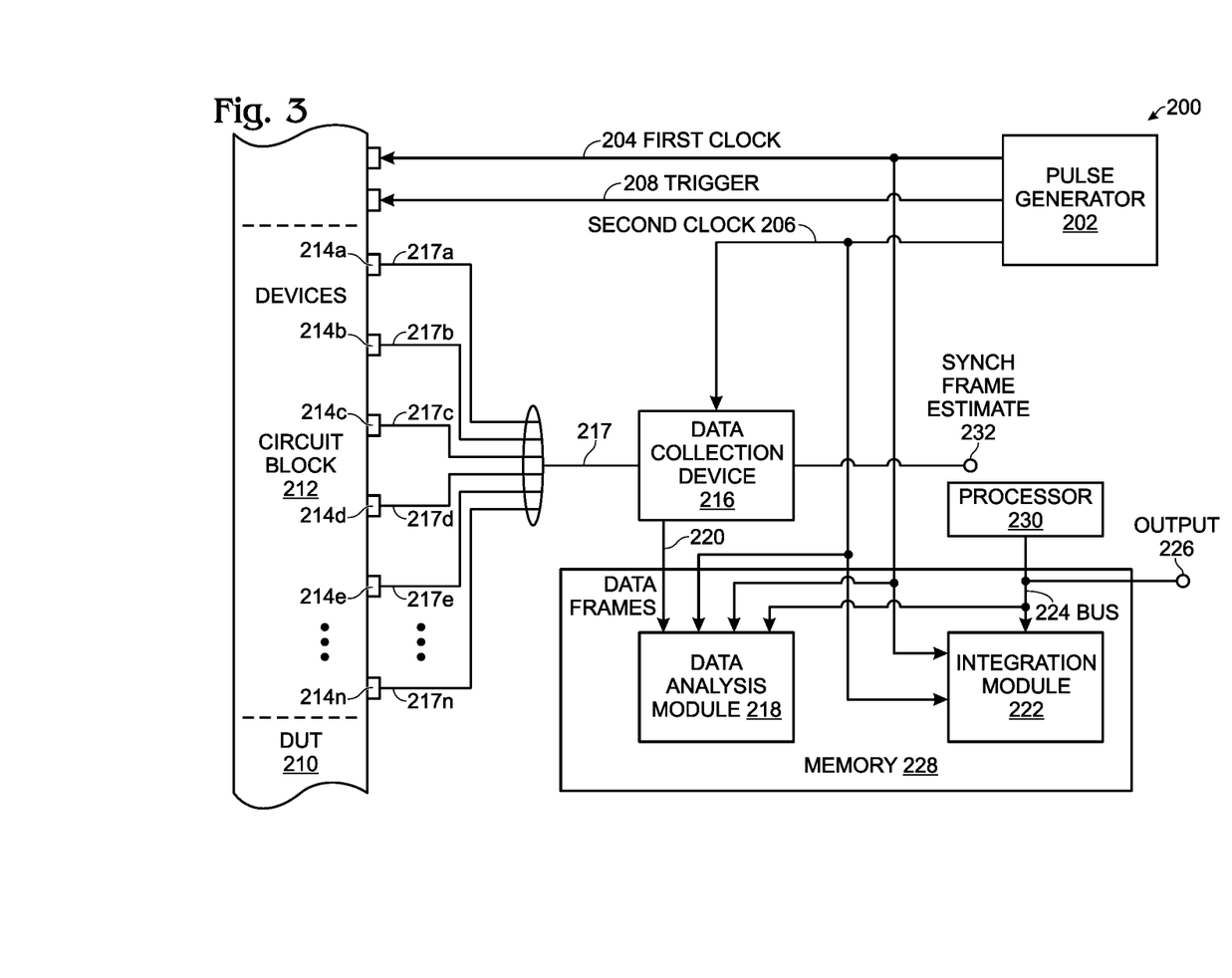
FIG. 3 is a schematic block diagram depicting a first variation of the data synchronization system of FIG. 2.

FIG. 3 is a schematic block diagram depicting a first variation of the data synchronization system of FIG. 2. In this aspect, the data collection device 216 is an electronic device, such as an oscilloscope, wired 217 to collected detection event signals from devices 214a through 214n. In another aspect not shown, the data collection device monitors and collects electric field data associated with devices 214.

Referencing both FIGS. 2 and 3, the data collection device 216 may have an input on line 232 to accept an estimation of a period associated with the synchronization (synch) frames. Typically, the data collection device collects data frames for at least two synchronization frame periods. If the collection device is a camera, the signal on line 232 would control the period of time over which image data is collected.

The data analysis module 218 typically determines the first device in response to one of two ways. In one aspect, the data analysis module receives a coordinate input locating the first device in the circuit block. That is, the location of the first device is predetermined. Alternately, an analysis is performed to determine the device having the fewest number of approximately periodic detection events, as viewed from the perspective of the first clock.

The data analysis module 218 saves high contrast data frames over a plurality of first repetition rate clock periods, and determines an average number of device output detection events per frame. The data analysis module sets a threshold above the average number, and saves frames having a number of device output detection events greater than the threshold.

The integration module 222 creates at least one loop time sequence, where the loop sequence includes a plurality of saved data frames in a sequential order in time, beginning with a synchronization frame. More explicitly, the data collection device 216 collects groups of n data frames per first repetition rate clock period (i.e. the second repetition rate=n× the first repetition rate). The integration module 222 creates the loop sequence beginning with a synchronization frame, followed by a sequence of groups of saved data frames. More typically, the integration module 222 integrates the saved data frames from each group into an integrated frame. In this manner, the integration module 222 creates a loop sequence beginning with a synchronization frame followed by a sequence of integrated frames, where frames in the loop sequences are clocked at the first clock repetition rate.

In one aspect, the pulse generator 202 is interfaced to a DUT circuit block 212 of bipolar transistor (BJT) devices 214. In that case, the data analysis module 218 discards data frames occurring during third clock transitions. Alternately, the pulse generator 202 is interfaced to a DUT circuit block 212 of CMOS transistor devices 214, and the data analysis module 218 saves data frames occurring during third clock transitions.

Functional Description

Figure 5A:
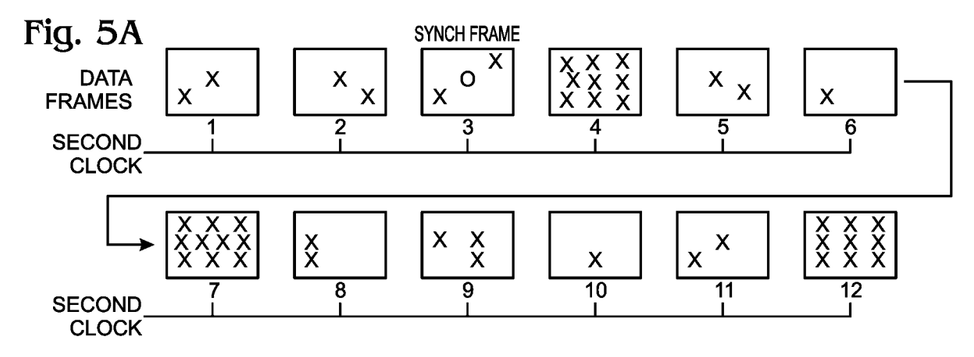
FIGS. 5A through 5C depict sequences of data frames in a process that reorganizes high contrast data frames at the first clock rate, beginning with a synchronization frame.
Figure 5B:
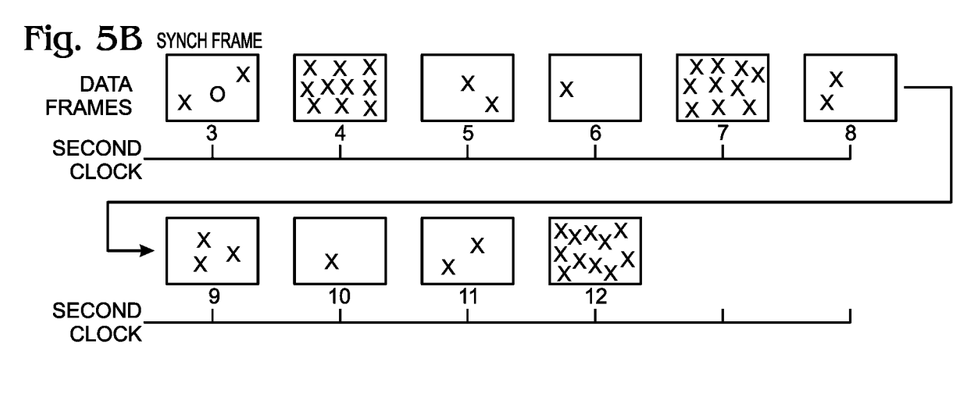
Figure 5C:
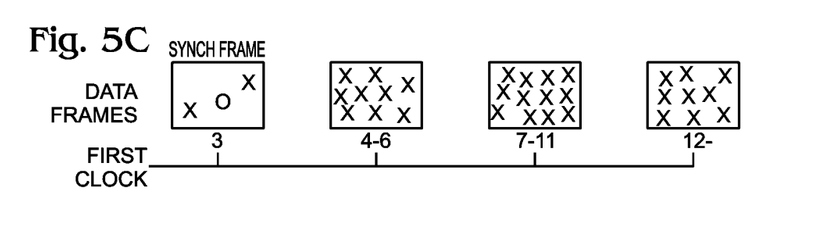

FIGS. 5A through 5C depict sequences of data frames in a process that reorganizes high contrast data frames at the first clock rate, beginning with a synchronization frame. In FIG. 5A, data frames are collected at the second (sampling) clock rate. The "x" symbols represent detection events and the "o" symbols represent a detection event associated with the first device. The third frame is recognized as the synchronization (synch) frame. In FIG. 5B, the frames are arranged so that the sequence begins with the synchronization frame, frame 3. Frames 4, 7, and 12 are recognized as high contrast frames. In FIG. 5C, the subframes between high contrast frames are integrated together with the high contrast frames, and the frames are retimed to the first clock rate. Alternately (i.e. CMOS devices are being tested), the low contrast frames are discarded, and just the high contrast frames are used—retimed to the first clock.

The above analysis more typically applies to good, normal functioning devices. For a failed device, what should be a low contrast frame might actually show devices with high output. That is, instead of emitting light only during third clock switching, they might continue the give off light between switching due to a short or leakage failure, In the systems of FIGS. 2 and 3, information is collected and stored over a time period about three times longer than the length of the actual data pattern of interest from asynchronous circuitry. The information is collected and stored asynchronously, but continuously for each frame loop. In the case of image data collection, one pixel of light emission in the XY information image is selected that is known to be repeating and synchronous to the internal asynchronous circuit within each collected time frame loop, which is referred to herein as first device detection events. The first device detection events are clocked at the third clock. Typically, there are a large number of third clock periods between first device detection events. The pixel with the lowest repetition rate may be selected from a transistor that switches with an internal enable or reset line. Ideally, the first device detection event occurs once per time frame loop and is the "software trigger pixel".

The data pattern of the stored image in real-time is displaced in time by varying amounts within the total time of each frame loop collected. This displacement is corrected by realigning the switching time of the selected pixel (each time it turns on and emits light) in each stored frame loop, to that same pixel in every other frame loop, again when it switches. The realignment can be performed in software by placing the selected pixel at the same relative location in memory for each frame loop. The timing diagram or waveform from every other pixel in the time resolve images can then be reconstructed by combining the information from each respective pixel from the stored frames, once they have all been realigned with respect to the selected "software trigger pixel". The light emission images are collected in a sampling scope mode. The sampled image frames are summed together so that there is enough information to reconstruct a waveform. The summing step is performed after the realignment step. Therefore, all of the pre-aligned images are held in memory until they are realigned and summed together.

Assuming BJT devices and a 4× sampling rate, low contrast frames are an indicator of the occurrence of an asynchronous (third) clock, and realignment can be based on the low contrast frame, which should repeat about every fourth frames. However, since the asynchronous clock period is only estimated, it may be that the low contrast frames occur after three frames or sometimes after five frames. Therefore, it is often easiest to throw out the low contrast frame and sum together the high contrast subframes that occur between low contrast frames.

For CMOS circuits the highest contrast occurs with third clock transitions. In that case, only one high contrast frame is used per third clock period, and the other (low contrast) frames are discarded. Actually, it may not be necessary to discard the low contrast frames, as they produce very few detection events (detected light), unless there is a short or defect that results in steady state current during those logic conditions. More explicitly, the valid high contrast frames are the ones with the fewest number of pixels with valid counts in them and the other pixels ideally have zero counts. So, if oversampled at four times the rate, only one of the four subframes will have counts in them—where the third clock causes the state change. The other three subframes should have no counts in any pixel except for noise. So the average number is mostly the average of noise and the threshold value is set just above the noise. The high contrast frame is the one with valid counts above the noise.

Variations in the sampling (second) clock determine subframe timing, and in combination with the unknown asynchronous (third) clock of the circuit block under test; create a Beat frequency. The Beat frequency is at a rate that is the difference in frequency between the first and third clocks. Knowing the Beat frequency from the first group of testing allows a correction to be made to the second clock rate, so that it is in closer agreement with the circuit block third clock. When the beat frequency is "removed", the two clocks are at the same frequency.

With respect to image data collection, a high contrast frame has more pixels with high counts and more pixels with low counts than a low contrast frame. A low contrast frame is actually the combination of two high contrast frames each contributing about half the counts for each pixel. It is a combination because the clock has occurred and changed the state of transistors, so the brights are not as bright and the darks are not as dark. It averages toward the middle, which is what makes low contrast. This discussion applies to both CMOS and bipolar circuits. Only the high contrast subframes with the same group of four subframes (assuming a 4× sampling rate) are integrated together. If all high contrast frames were integrated together, regardless of which group of four subframes they belong to, then the result would average out to a low contrast frame. This is so because different pixels that have high counts from frame to frame.

Figure 4:
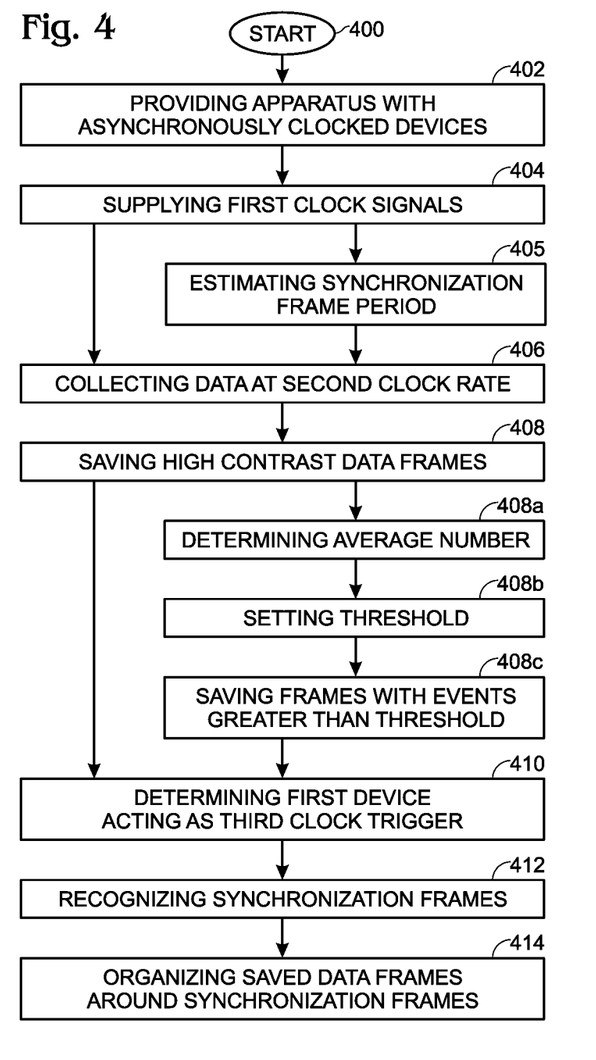
FIG. 4 is a flowchart illustrating a method for synchronizing data collected from asynchronously clocked circuitry.

FIG. 4 is a flowchart illustrating a method for synchronizing data collected from asynchronously clocked circuitry. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the steps follow in numerical order. The method starts at Step 400.

Step 402 provides an apparatus having inputs to accept a first clock signal and a synchronous trigger signal, and a circuit block including a plurality of devices. The plurality of devices is synchronously timed to a third clock, but is asynchronous from the first clock signal. Step 404 supplies the first clock signals, at a first clock repetition rate, and trigger signals to the apparatus. Step 406 simultaneously collects data frames for the plurality of devices, at a second clock repetition rate synchronous to the first clock, of device output detection events responsive to the trigger signal. The second clock repetition rate is greater than the first clock repetition rate. In one aspect, Step 405 estimates a period associated with the synchronization frames, and collecting data frames in Step 406 includes collecting data frames for at least two synchronization frame periods. In another aspect, Step 406 collects image data of device output signal transitions.

Step 408 saves high contrast data frames of device output detection events. Step 410 determines a first device in the circuit block acting as the third clock trigger. For example, Step 410 may determine the first device by locating the device at predetermined coordinates in the circuit block. Alternately, Step 410 may determine that the first device has the fewest number of approximately periodic detection events, as considered from the perspective of the first clock.

Step 412 recognizes saved data frames with first device output detection events as synchronization frames. Step 414 organizes the saved data frames around the synchronization frames. In one aspect, organizing the saved data frames around the synchronization frames in Step 414 includes creating at least one loop time sequence, where the loop sequence includes a plurality of saved data frames in a sequential order in time, beginning with a synchronization frame.

In one aspect, saving high contrast data frames in Step 408 includes substeps. Over a plurality of first repetition rate clock periods, Step 408*a* determines an average number of device output detection events per frame. Step 408*b* sets a threshold above the average number, and Step 408*c* saves frames having a number of device output detection events greater than the threshold.

In another aspect, simultaneously collecting data frames for the plurality of devices at the second clock repetition rate (Step 406) includes collecting groups of n data frames per first repetition rate clock period. Then, creating the loop time sequence in Step 414 includes creating the loop sequence beginning with a synchronization frame and followed by a sequence of groups of saved data frames. More explicitly, Step 414 may create the loop sequence by integrating the saved data frames from each group into an integrated frame. Then, the loop sequence begins with a synchronization frame followed by a sequence of integrated frames, where integrated frames in the loop sequences are clocked at the first clock repetition rate.

In one aspect, Step 402 provides a circuit block of bipolar transistor devices, and saving high contrast data frames in Step 408 includes discarding data frames occurring during third clock transitions. In another aspect, Step 402 provides a circuit block of CMOS transistor devices, and Step 408 saves data frames occurring during third clock transitions.

A system and method are providing for synchronizing data collected from asynchronously clocked circuitry. Details of parts and process steps have been given to illustrate the invention. However, the invention is not limited to merely these examples. Other variations and embodiments of the invention will occur to those skilled in the art.

I claim:

1. A method for synchronizing data collected from asynchronously clocked circuitry, the method comprising:
   providing an apparatus having inputs to accept a first clock signal and a synchronous trigger signal, and a circuit block including a plurality of devices, the plurality of devices synchronously timed to a third clock that is asynchronous from the first clock signal;
   supplying the first clock signals at a first clock repetition rate, and trigger signals to the apparatus;
   simultaneously collecting data frames for the plurality of devices at a second clock repetition rate synchronous to the first clock, of device output detection events responsive to the trigger signal, where the second clock repetition rate is greater than the first clock repetition rate;
   saving high contrast data frames of device output detection events;
   determining a first device in the circuit block acting as the third clock trigger;
   recognizing saved data frames with first device output detection events as synchronization frames; and,
   organizing the saved data frames around the synchronization frames.

2. The method of claim 1 further comprising:
   estimating a period associated with the synchronization frames; and,
   wherein collecting data frames includes collecting data frames for at least two synchronization frame periods.

3. The method of claim 2 wherein determining the first device in the circuit block acting as the third clock trigger includes an operation selected from a group consisting of locating the first device at predetermined coordinates in the circuit block and determining that the first device has a fewest number of approximately periodic detection events, as considered from the perspective of the first clock.

4. The method of claim 1 wherein organizing the saved data frames around the synchronization frames includes creating at least one loop time sequence, where the loop sequence includes a plurality of saved data frames in a sequential order in time, beginning with a synchronization frame.

5. The method of claim 4 wherein saving high contrast data frames includes:
   over a plurality of first repetition rate clock periods, determining an average number of device output detection events per frame;
   setting a threshold above the average number; and,
   saving frames having a number of device output detection events greater than the threshold.

6. The method of claim 5 wherein simultaneously collecting data frames for the plurality of devices at the second clock repetition rate includes collecting groups of n data frames per first repetition rate clock period; and,
   wherein creating the loop time sequence includes creating the loop sequence beginning with a synchronization frame and followed by a sequence of groups of saved data frames.

7. The method of claim 6 wherein creating the loop sequence includes integrating the saved data frames from each group into an integrated frame.

8. The method of claim 7 wherein creating the loop sequence includes creating a loop sequence beginning with a synchronization frame followed by a sequence of integrated frames, where integrated frames in the loop sequences are clocked at the first clock repetition rate.

9. The method of claim 1 wherein simultaneously collecting data frames of device output detection events includes collecting image data of device output signal transitions.

10. The method of claim 9 wherein providing the circuit block including the plurality of devices includes providing a circuit block of bipolar transistor devices; and,
    wherein saving high contrast data frames includes discarding data frames occurring during third clock transitions.

11. The method of claim 9 wherein providing the circuit block including the plurality of devices includes providing a circuit block of CMOS transistor devices; and,
    wherein saving high contrast data frames includes saving data frames occurring during third clock transitions.

12. A system for synchronizing data collected from a device under test with asynchronously clocked circuitry, the system comprising:
    a pulse generator to supply a first clock signal at a first clock repetition rate, a second clock at a second clock repetition rate greater than the first clock repetition rate, and a synchronous trigger signal, the pulse generator supplying the first clock and trigger signals to a device under test (DUT) having a circuit block including a plurality of devices synchronously timed to a third clock that is asynchronous from the first clock signal;
    a data collection device having an input connected to the pulse generator to receive the second clock signal and an input to simultaneously collect data frames for the plurality of devices at the second clock repetition rate, of device output detection events responsive to the trigger signal;
    a data analysis module having inputs to accept the first and second clock signals, and the collected data frames, the data analysis module saving high contrast data frames of device output detection events, determining a first device in the circuit block acting as the third clock trigger, and recognizing saved data frames with first device output detection events as synchronization frames; and,
    an integration module having an inputs to accept the first and second clock signals, the saved data frames, and the synchronization frames, and having an output to supply the saved data frames organized around the synchronization frames.

13. The system of claim 12 wherein the data collection device has an input to accept an estimation of a period associated with the synchronization frames, the data collection device collecting data frames for at least two synchronization frame periods.

14. The system of claim 13 wherein the data analysis module determines the first device in response to an operation selected from a group consisting of receiving an coordinate input locating the first device in the circuit block and an analysis to determine the device having a fewest number of approximately periodic detection events, as viewed from the perspective of the first clock.

15. The system of claim 12 wherein the integration module creates at least one loop time sequence, where the loop sequence includes a plurality of saved data frames in a sequential order in time, beginning with a synchronization frame.

16. The system of claim 15 wherein the data analysis module saves high contrast data frames over a plurality of first repetition rate clock periods, determines an average number of device output detection events per frame, sets a threshold above the average number, and saves frames having a number of device output detection events greater than the threshold.

17. The system of claim 16 wherein the data collection device collects groups of n data frames per first repetition rate clock period; and, wherein the integration module creates the loop sequence beginning with a synchronization frame and followed by a sequence of groups of saved data frames.

18. The system of claim 17 wherein the integration module integrates the saved data frames from each group into an integrated frame.

19. The system of claim 18 wherein the integration module creates the loop sequence beginning with a synchronization frame followed by a sequence of integrated frames, where frames in the loop sequences are clocked at the first clock repetition rate.

20. The system of claim 12 wherein the data collection device is a camera having an interface for collecting image data of device output signal transitions.

21. The system of claim 20 wherein the pulse generator is interfaced to a DUT circuit block of bipolar transistor devices; and, wherein the data analysis module discards data frames occurring during third clock transitions.

22. The system of claim 20 wherein the pulse generator is interfaced to a DUT circuit block of CMOS transistor devices; and, wherein the data analysis module saves data frames occurring during third clock transitions.

\* \* \* \* \*